US008700048B2

(12) United States Patent
Kamdar et al.

(10) Patent No.: US 8,700,048 B2
(45) Date of Patent: Apr. 15, 2014

(54) METHOD AND APPARATUS FOR AUTOMATED PUBLISHING OF CUSTOMIZED PRESENCE INFORMATION

(75) Inventors: Kashyap Kamdar, Palatine, IL (US); Mohammed M. Ahmed, Schaumburg, IL (US); Amol Tuli, Elgin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 1213 days.

(21) Appl. No.: 11/853,474

(22) Filed: Sep. 11, 2007

(65) Prior Publication Data

US 2009/0066510 A1    Mar. 12, 2009

(51) Int. Cl.
*H04W 24/00* (2009.01)
*H04M 3/42* (2006.01)

(52) U.S. Cl.
USPC .......... 455/456.1; 455/456.2; 455/456.3; 455/456.5; 455/456.6; 455/457; 455/414.1; 455/414.2; 455/414.3; 455/518; 455/466; 455/418

(58) Field of Classification Search
USPC .......... 455/412.1, 412.2, 414.1, 414.2, 456.1, 455/456.2, 456.3, 456.5, 518, 519, 414.3, 455/418, 419, 517, 456.6, 457, 466; 709/203, 204, 217, 218, 227
See application file for complete search history.

(56) References Cited

U.S. PATENT DOCUMENTS

| | | | | |
|---|---|---|---|---|
| 6,177,905 | B1 * | 1/2001 | Welch | 342/357.75 |
| 6,625,457 | B1 * | 9/2003 | Raith | 455/456.1 |
| 6,668,173 | B2 * | 12/2003 | Greene | 455/445 |
| 6,968,179 | B1 * | 11/2005 | De Vries | 455/414.1 |
| 6,993,327 | B2 * | 1/2006 | Mathis | 455/414.1 |
| 7,274,299 | B2 * | 9/2007 | Osman | 340/686.1 |
| 7,394,405 | B2 * | 7/2008 | Godden | 340/996 |
| 7,565,136 | B1 * | 7/2009 | Kinsella | 455/412.1 |
| 8,391,857 | B2 * | 3/2013 | Catalano et al. | 455/432.1 |
| 2001/0007441 | A1 * | 7/2001 | Yamamoto | 340/994 |

(Continued)

FOREIGN PATENT DOCUMENTS

| | | |
|---|---|---|
| CN | 1859320 A | 11/2006 |
| EP | 1542430 A1 | 6/2005 |

(Continued)

OTHER PUBLICATIONS

International Search Report and Written Opinion for International Application No. PCT/US2008/074998 mailed on Mar. 16, 2009.

(Continued)

*Primary Examiner* — Olumide T Ajibade Akonai

(57) ABSTRACT

A method and apparatus for automated publishing of customized presence information to one or more mobile devices in a wireless communication network is provided. The method comprises obtaining (202) location data of a mobile device. Further, the method comprises determining (204) availability of a customized presence tag related to the location data of the mobile device. A customized presence tag includes personalized data associated with a location of a mobile device. The method further comprises publishing (206) the customized presence tag related to the location data of the mobile device, when the customized presence tag is determined to be available for the location data. Moreover, the method comprises publishing (208) a default presence tag for the location data when a customized presence tag for the location data is determined to be unavailable. The publishing of one or more of the customized presence tag and the default presence tag is performed automatically.

16 Claims, 6 Drawing Sheets

(56) References Cited

U.S. PATENT DOCUMENTS

| | | | |
|---|---|---|---|
| 2004/0003042 A1 | 1/2004 | Horvitz et al. | |
| 2004/0193686 A1 | 9/2004 | Blagsvedt et al. | |
| 2004/0203644 A1* | 10/2004 | Anders et al. | 455/414.1 |
| 2004/0203768 A1* | 10/2004 | Ylitalo et al. | 455/435.1 |
| 2004/0266398 A1* | 12/2004 | Adamczyk et al. | 455/412.1 |
| 2005/0143097 A1* | 6/2005 | Wilson et al. | 455/456.3 |
| 2006/0099911 A1 | 5/2006 | Shibuya | |
| 2006/0166678 A1* | 7/2006 | Karaoguz et al. | 455/456.1 |
| 2007/0069888 A1 | 3/2007 | Parameswar | |
| 2008/0026729 A1* | 1/2008 | May et al. | 455/414.1 |
| 2008/0182589 A1* | 7/2008 | Buccieri | 455/456.3 |
| 2008/0318592 A1* | 12/2008 | Mandalia | 455/456.1 |
| 2009/0047972 A1* | 2/2009 | Neeraj | 455/456.1 |

FOREIGN PATENT DOCUMENTS

| | | | |
|---|---|---|---|
| EP | 1835665 A1 | 9/2007 | |
| WO | 2006122262 A2 | 11/2006 | |
| WO | 2006125992 A1 | 11/2006 | |

OTHER PUBLICATIONS

International Preliminary Report on Patentability & Written Opinion for International Application No. PCT/US2008/074998 mailed on Mar. 25, 2010.

Supplementary European Search Report mailed on Nov. 7, 2011 in European Patent application No. 08830941.4.

English Language Translation of Korean Office Action mailed on May 26, 2011 in Korean Patent Application No. 10-2010-7005315.

English Language Translation of Korean Notice of Allowance mailed on Nov. 29, 2011 in Korean Patent Application No. 10-2010-7005315.

English Language Translation of Chinese Office Action mailed Jul. 31, 2012 in Patent Application No. 200880106509.7.

English Language Translation of Chinese Office Action mailed Jul. 1, 2013 in Patent Application No. 200880106509.7.

Decision to Grant mailed Feb. 21, 2013 in European Patent Application No. 08830941.4.

* cited by examiner

METHOD AND APPARATUS FOR AUTOMATED PUBLISHING OF CUSTOMIZED PRESENCE INFORMATION

FIELD OF THE INVENTION

The invention generally relates to publishing presence information of a mobile device user in a wireless communication network. More specifically, the invention relates to a method and apparatus for automated publishing of customized presence information of a user of a mobile device to one or more other mobile devices who have subscribed to receive the customized presence information in a wireless communication network.

BACKGROUND OF THE INVENTION

Wireless communication networks are capable of facilitating a user having a mobile device to publish their presence state to other users through an Instant Messaging (IM) presence client. Presence state conveys information regarding the status of a user at a certain location. The presence state of the user may pertain to various presence attributes. For example, the presence state of the user may be set by a user to presence attributes indicating availability and willingness of the user for communication. Presence tags denoted using texts such as "free", "busy", "away", or "do not disturb" can be published to the others when the user intends to publish the user's presence state using the IM presence client. The user manually selects a presence tag and manually changes the presence tag related to the presence state. Other users who have subscribed for receiving information regarding the presence state of this user get informed about the change in the user's presence state. Manually updating the presence information each time the user intends to inform the change in his or her presence state causes inconvenience to the user. In addition, presence information can be modified based on the status of the user when using an application. For example, IM systems provide updated presence information such as "online," "offline," "busy" and "away."

BRIEF DESCRIPTION OF FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the technology of the subject.

Figure 1:
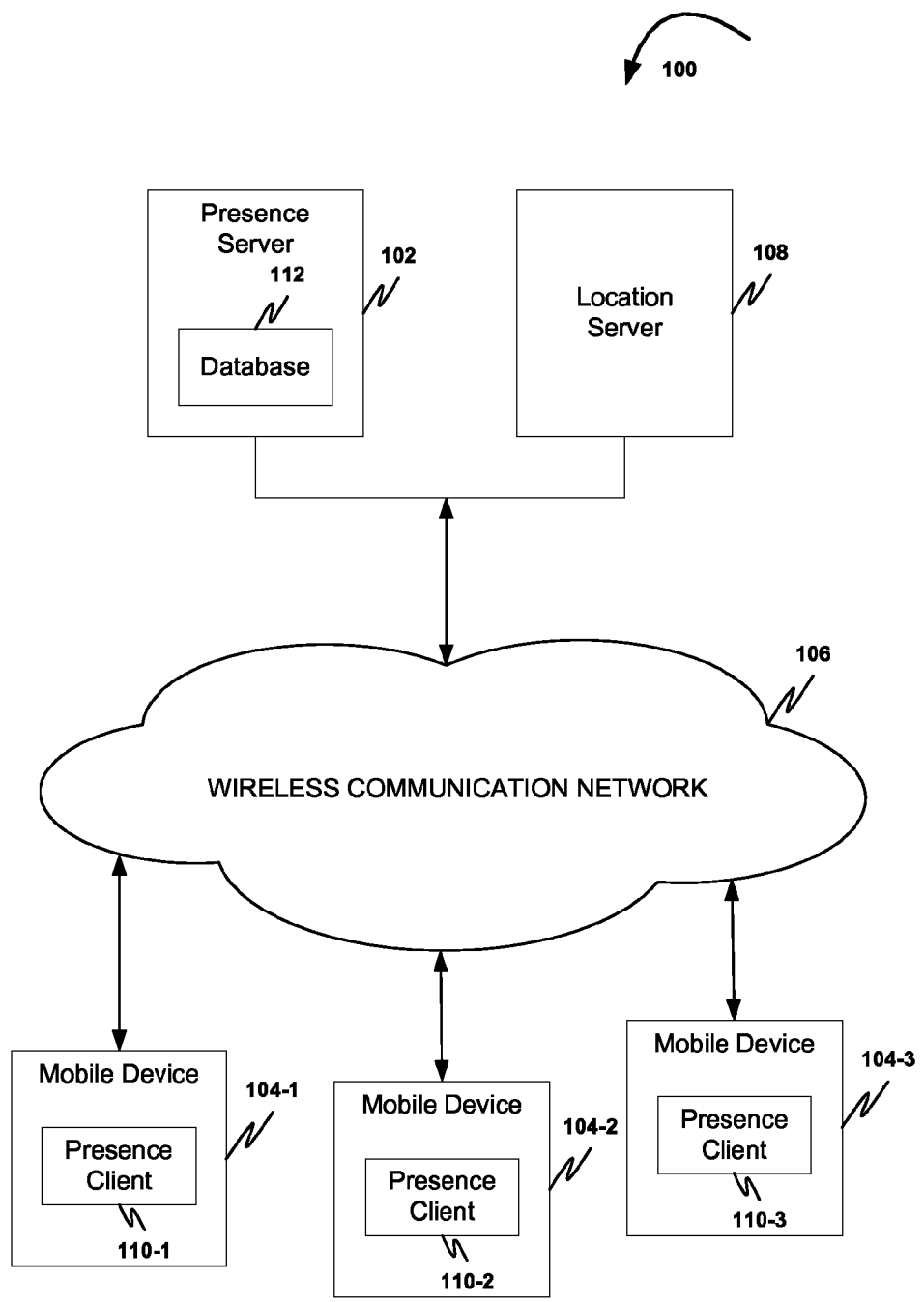
FIG. 1 is a block diagram showing an environment (that is exemplary) for the invention to function in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments.

DETAILED DESCRIPTIONS OF THE INVENTION

Before describing in detail embodiments that are in accordance with the technology of the subject, it should be observed that the embodiments reside primarily in combinations of a method and apparatus for automated publishing of customized presence information to one or more mobile devices in a wireless communication network. Accordingly, the apparatus components and method steps have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments described herein may be comprised of one or more conventional processors and unique stored program instructions that control the one or more processors to implement, in conjunction with certain non-processor circuits, some, most, or all of the functions of method and apparatus for automated publishing of customized presence information to one or more mobile devices in a wireless communication network described herein. The non-processor circuits may include, but are not limited to, a radio receiver, a radio transmitter, signal drivers, clock circuits, power source circuits, and user input devices. As such, these functions may be interpreted as steps of a method to perform automated publishing of customized presence information to one or more mobile devices in a wireless communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various embodiments provide a method and apparatus for automated publishing of customized presence information to one or more mobile devices in a wireless communication network. The method comprises obtaining location data of a mobile device. Further, the method comprises determining availability of a customized presence tag related to the location data. A customized presence tag includes personalized data associated with a location of a mobile device. The method further comprises automatically publishing the customized presence tag related to the location data when the customized presence tag is determined to be available for the location data. Moreover, the method comprises publishing a default presence tag for the location data when a customized presence tag for the location data is determined to be unavailable.

Referring to FIG. 1, a block diagram showing a wireless communication system 100 in which various embodiments can function is illustrated. The wireless communication system 100 comprises a presence server 102 and one or more mobile devices 104-n. The one or more mobile devices 104-n communicate with the presence server 102 using a wireless communication network 106. The wireless communication network 106 provides a service for publishing presence information of a user through the presence server 102 and a location server 108.

One or more mobile device are depicted as mobile 104-1 through 104-n. In an embodiment, the mobile devices 104-n can be a cellular phone, a Personal Digital Assistant (PDA), a laptop computer, a portable music device and other type of portable electronic devices. The wireless communication network 106, for example, can be one of, but not limited to Global System for Mobile communication (GSM) system, Code Division Multiple Access (CDMA) system, UMTS, Worldwide Interoperability for Microwave Access (WiMax) system, Wireless Fidelity (WiFi) systems.

Each of the mobile devices 104-1 through 104-n have presence clients 110-1 through 110-n respectively. The presence clients 110-n facilitate one or more users of the mobile devices 104-n to customize presence information related to a location of the mobile devices 104-n. Also, the presence clients 110-n communicate with the presence server 102 to publish a customized presence tag related to the location of the mobile devices 104-n. A customized presence tag includes personalized data associated with the location as specified by a user. For example, when a user of the mobile device 104-1 visits a location within the wireless communication network 106, the user may desire to publish the user's presence information with respect to the location to one or more other users.

In order to publish a customized presence tag with respect to a location of the mobile device 104-1, the user of the mobile device 104-1 can define a customized presence tag using the presence client 110-1 of the mobile device 104-1. Alternatively, the user can select the customized presence tag from one or more presence tags on a presence tag list. The presence tag list includes one or more customized presence tags defined by the user of the mobile device 104-1. A database (not shown) in the mobile device 104-1 of the user can store the presence tag list. In an embodiment, the one or presence tags can be pre-populated in the database of the mobile device 104-1 using user profine, context and location data regarding the mobile device. For example, the one or more presence tags can be "Busy", "Free to Chat", "Free for Lunch", "Business Meeting", etc. In an embodiment, the user of the mobile device 104-1 may visit a location for which a customized presence tag is not defined when no customized presence tag is avialable. Correspondingly, the presence server 102 can initiate display of the one or more presence tags on the mobile device 104-1, when the user intends to define a customized presence tag for the current location. Further, in an embodiment, the one or more presence tags may be displayed to the user of the mobile device 104-1 based on a user profile of the user, one or more characteristics of the visited location, etc.

When a customized presence tag is defined using the presence client 110-1 or selected from the one or more presence tags, the presence client 110-1 sends the customized presence tag to the presence server 102. Upon receiving the customized presence tag from the mobile device 104-1, the presence server 102 queries the location server 108 for location data pertaining to the location of the mobile device 104-1. Subsequently, the presence server 102 stores the location data and the customized presence tag of the mobile device 104-1 corresponding to the location in a database 112.

The presence server 102 automatically publishes the customized presence tag related to the location data of the mobile device 104-1 as stored in the database 112, whenever the mobile device 104-1 visits the location.

In accordance with an embodiment, the user of the mobile device 104-1 may exit from a location for which a customized presence tag is published and subsequently enter another location for which a customized presence is not defined. In such situations, a default tag is automatically published to the mobile devices 104-n. This is explained in detail in conjunction with FIG. 2 described below.

Figure 2:
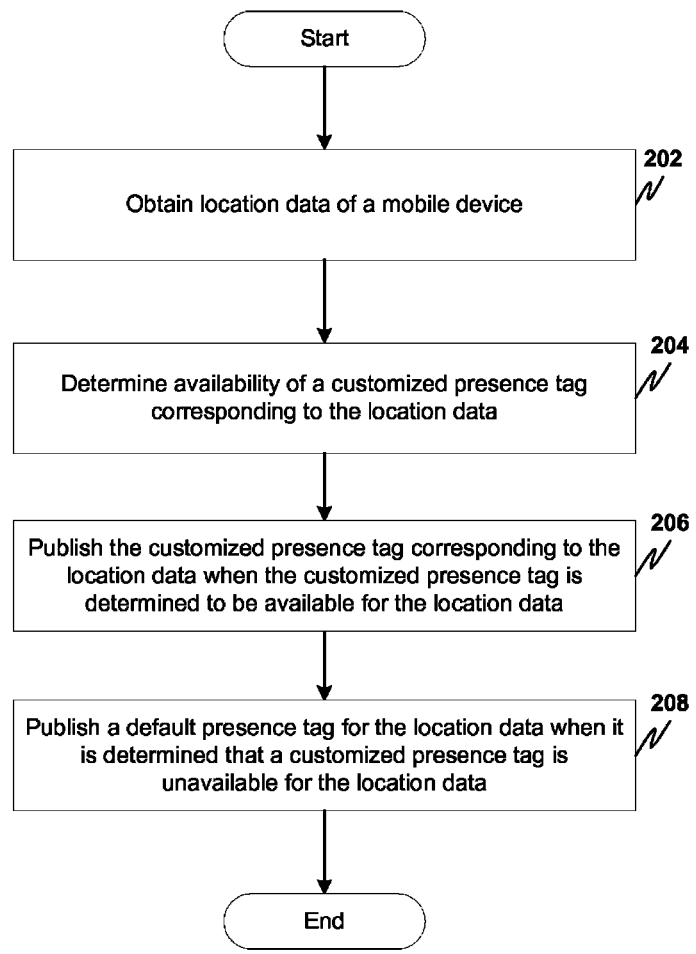
FIG. 2 is a flow diagram of a method for automated publishing of a customized presence tag to one or more mobile devices in a wireless communication network in accordance with an embodiment.

Turning to FIG. 2, a flow diagram of a method for automated publishing of a customized presence tag to one or more mobile devices 104-n in a wireless communication network 106 in accordance with an embodiment is shown. Location data of a mobile device such as the mobile device 104-1 is obtained 202. The location data of the mobile device 104-1 may comprise latitude and longitude data of a location of the mobile device 104-1. In an embodiment, the presence server 102 may obtain the location data from the location server 108. The location server 108 can track locations of the mobile device 104-1 by means of location tracking mechanisms such as Global Positioning System (GPS) etc. In another embodiment, the mobile device 104-1 may include a location tracking mechanism such as an Assisted GPS (AGPS). Therefore, the presence server 102 may obtain the location data from the AGPS of the mobile device 104-1.

Further, the presence server 102 can subscribe to the location server 108 for obtaining updates pertaining to mobility data of the mobile device 104-1. Therefore, the presence server 102 receives updates from the location server 108 in response to movement of the mobile device 104-1 from one location to another location. Based on the mobility data of the mobile device 104-1, the location data of the mobile device 104-1 is updated in the database 112 of the presence server 102.

When the location data of the mobile device 104-1 is obtained, availability of a customized presence tag related to the location data is determined 204 at the presence server 102. The database 112 stores associations of one or more customized presence tags with one or more locations that correspond to location data of the mobile device 104-1. A customized presence tag includes personalized data associated with a location. Personalized data is set, selected or designated by the user for the mobile device and describes the location or the user's activity at the location and other related descriptors. The personalized data can include, for example, but not limited to, user specific data, a dimensional measures corresponding to a location, an expire time corresponding to the customized presence tag and a schedule information corresponding to the customized presence tag. The user specific data can be any data associated by the user to the location, a UserId of the mobile device, the expire time can be a time duration at which the customized presence tag would be made inactive in the database 112 and the schedule information can be a time duration for which the customized presence tag would be active in the database 112.

The database 112 can be dynamically populated and updated with different customized presence tags whenever such a customized presence tag is defined or updated by one or more users. The dynamic population of the database 112 refers to effective management of populating the database 112 in real time. For example, the presence server 102 may employ a scheduling scheme to update the database 112 when it receives information or data corresponding to new and updated customized presence tags from one or more mobile devices.

In an embodiment, if the customized presence tag related to the location data of the mobile device 104-1 is determined to be available in the database 112, the customized presence tag is published 206 to the mobile device 104-1 of the user and to mobile devices belonging to other users including mobile devices 104-n. The customized presence tag is published automatically by the presence server 102 to the mobile devices 104-n according to the location of the mobile device and the availability of the customized presence or default tags for that location.

Alternatively, if the customized presence tag for the location data of the mobile device 104-1 is determined to be unavailable in the database 112, the default presence tag is published 208 to the mobile device 104-1 of the user and to mobile devices of other users including mobile devices 104-n. A default presence tag can denote a customized presence tag related to a previous location from where the user of the mobile device 104-1 entered the current location for which a customized presence tag exists. When the user of the mobile device 104-1 enters the current location, the customized presence tag related to the previous location or status of the mobile device 104-1 is stored in the database 112 as the default presence tag. The unavailability of a customized presence tag corresponding to a location data in the database 112 may be due to the user of the mobile device 104-1 visiting a new location. In that case it may happen that location data pertaining to the new location of the mobile device 104-1 may be unavailable in the database 112. Moreover, the default presence tag is automatically published by the presence server 102 to the mobile devices 104-n. Accordingly, in an embodiment, the user of the mobile device 104-1 may choose to change the default presence tag when moving through the new location for which a customized presence tag is not defined.

In accordance with an embodiment, the user can specify a customized presence tag for the new location using the presence client 110-1, which in turn gets stored in the database 112 for the new location. Subsequently, the presence server 102 automatically publishes the customized presence tag pertaining to the new location instead of the default presence tag. The method for specifying a customized presence tag corresponding to a location of a mobile device 104-1 in a wireless communication network 106 is explained in conjunction with FIG. 3.

In another embodiment, the user can update the customized presence tag corresponding to the location data of the mobile device 104-1. The user can define an updated customized presence tag using the presence client 110-1 and send it to the presence server 102. Thereafter, an entry corresponding to the location data in the database 112 is updated with the updated customized presence tag. Subsequently, the updated customized presence tag is published automatically whenever the user revisits the location according to the location of the mobile device and the availability of a customized or default presence tag for that location.

In yet another embodiment, the user of the mobile device 104-1 may desire to remove a customized presence tag related to a location of the mobile device 104-1. In such a situation, the user of the mobile device 104-1 may send a delete request to the presence server 102 for removing the customized presence tag. The location data related to the location of the mobile device 104-1 is retrieved from the location server 108 in response to the delete request from the mobile device 104-1. Thereafter, an entry corresponding to the location data in the database 112 is removed. Subsequently, the default presence tag is automatically published whenever the user revisits the location.

In accordance with an embodiment, the user of the mobile device 104-1 may desire to restore a customized presence tag related to a location of the mobile device 104-1 that has been previously deleted. In such situations, the user can send a restore request to the presence server 102 from the mobile device 104-1. Subsequently, upon receiving the restore request from the mobile device 104-1, the presence server 102 obtains location data pertaining to the current location of the mobile device 104-1. Thereafter, the customized presence tag related to the current location of the mobile device 104-1 is restored by the presence server 102.

Figure 3:
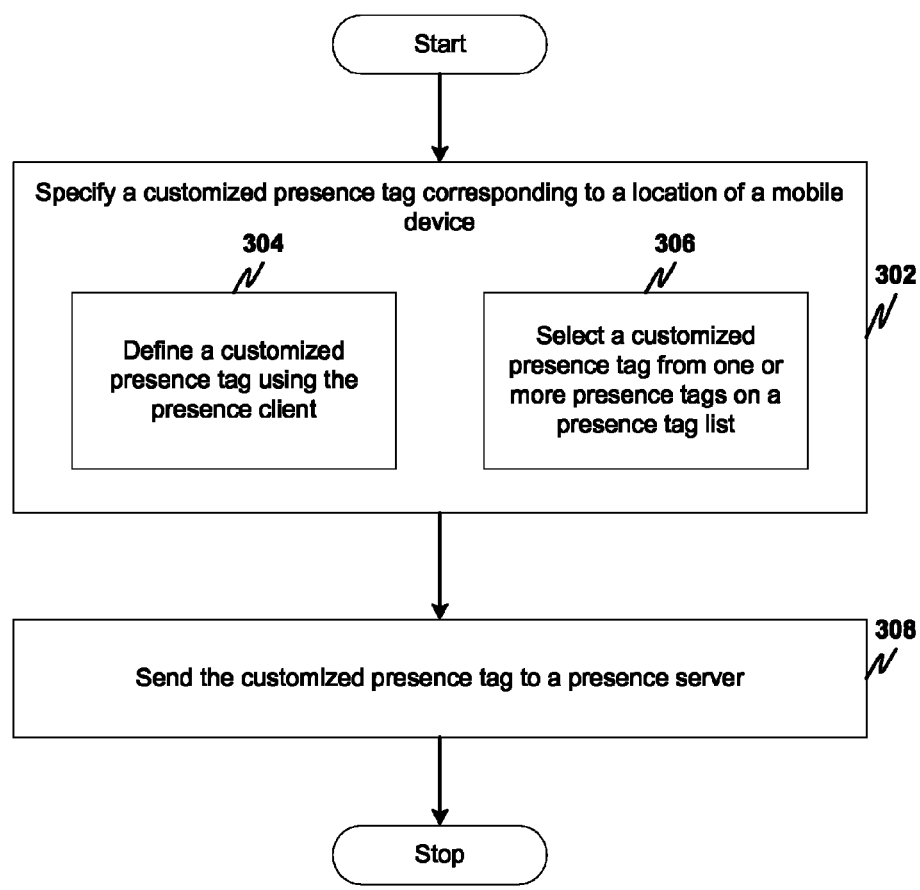
FIG. 3 is a flow diagram of a method for specifying a customized presence tag corresponding to a location of a mobile device in a wireless communication network in accordance with an embodiment.

Turning to FIG. 3, a flow diagram of a method for specifying a customized presence tag corresponding to a location of a mobile device 104-1 in a wireless communication network 106 in accordance with an embodiment is shown. In an embodiment, when a user of the mobile device 104-1 visits a location the user can specify 302 a customized presence tag corresponding to the location of the user using the mobile device 104-1. In another embodiment, the user of the mobile device 104-1 may specify a customized presence tag without associating the customized presence tag with the visited location. Further, in another embodiment, the user can define 304 a customized presence tag using the presence client 110-1 of the mobile device 104-1. Alternatively, the user can select 306 the customized presence tag from one or more presence tags on a presence tag list available in the database of the mobile device 104-1. Further, upon specifying the customized presence tag, the customized presence tag is sent 308 to a presence server, such as the presence server 102. The customized presence tag is thereafter associated with one or more locations that correspond to location data of the mobile device 104-1. This is further detailed in conjunction with FIG. 4.

Figure 4:
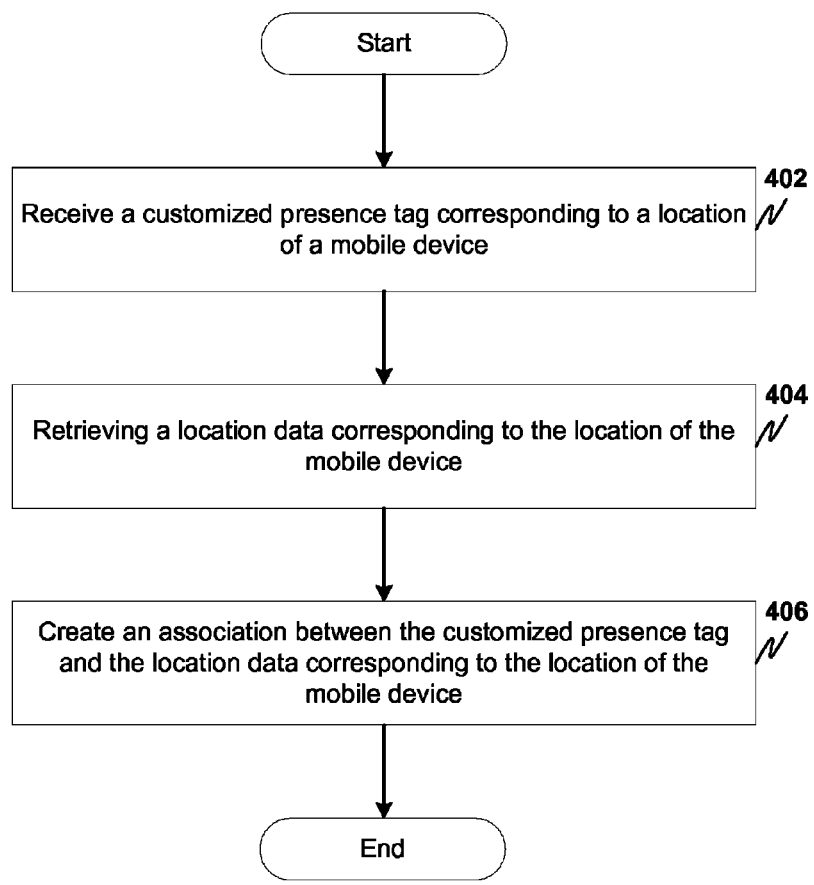
FIG. 4 is a flow diagram of a method for creating an association between a customized presence tag and location data corresponding to a location of a mobile device in a wireless communication network in accordance with an embodiment.

Referring to FIG. 4, a flow diagram of a method for creating an association between a customized presence tag and location data corresponding to a location of a mobile device 104-1 in a wireless communication network 106 in accordance with an embodiment is shown. The customized presence tag pertaining to the location of the mobile device 104-1 is received 402 at the presence server 102 from the mobile device 104-1. The customized presence tag includes personalized data associated with the location of the mobile device 104-1. The personalized data can include, for example, but not limited to, user specific data, a dimensional measures corresponding to a location, an expire time corresponding to the customized presence tag and a schedule information corresponding to the customized presence tag. The user specific data can be any data associated by the user to the location, a UserId of the mobile device, the expire time can be a time duration at which the customized presence tag would be made inactive and the schedule information can be a time duration for which the customized presence tag would be active.

In response to receiving the customized presence tag, the location data related to the location of the mobile device 104-1 is retrieved 404 from the location server 108. Thereafter, an association between the customized presence tag and the location data pertaining to the location of the mobile device 104-1 is created 406 at the presence server 102 by linking together the content of the customized presence tag designated by the user with the location of the mobile device 104-1 in the database. The association between the customized presence tag and the location data is stored in the database 112 of the presence server 102 to be published and for later use. In an embodiment, a customized presence tag corresponding to the location data pertaining to the location of mobile device 104-1 can be replaced with an updated customized presence tag.

In an embodiment, the association between one or more customized presence tags and one or more location data corresponding to a mobile device is used to publish a customized presence tag for the location of the mobile device.

Figure 5:
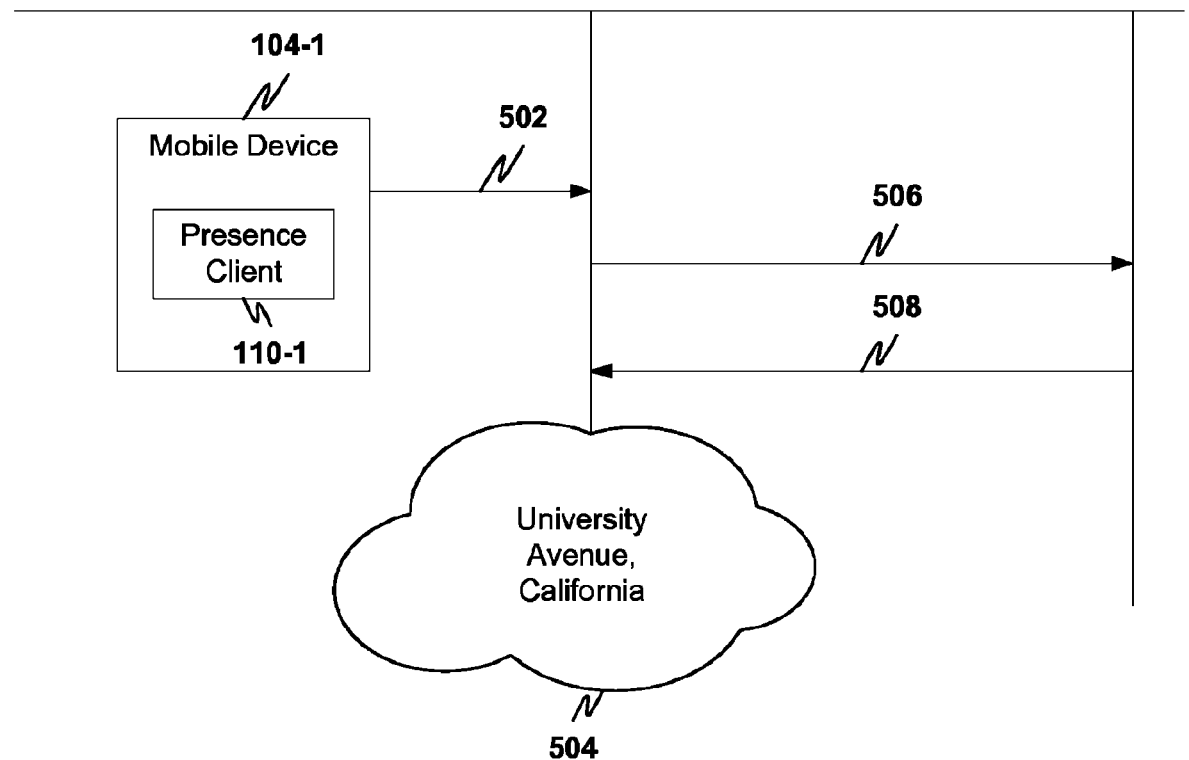
FIG. 5 is a block diagram showing an exemplary embodiment for automated publishing of a customized presence tag to one or more mobile devices in a wireless communication network in accordance with an embodiment.

FIG. 5 is a block diagram showing an exemplary embodiment for automated publishing of a customized presence tag to one or more mobile devices 104-n in a wireless communication network in accordance with an embodiment. A user of the mobile device 104-1 visits 502 a location 504. Prior to entering the location 504, the user of the mobile device 104-1 may define a customized presence tag, e.g. "Free," without associating the customized presence tag with the current location of the mobile device 104-1. Accordingly, the customized presence tag "Free" is sent from the presence client 110-1 to the presence server 102. On receiving the customized presence tag "Free", the presence server 102 stores the customized presence tag "Free" as the default presence tag in the database 112. Thereafter, the customized presence tag "Free" is published to the mobile device 104-1 and to one or more other mobile devices. Upon visiting the location 504, the user may desire to define a customized presence tag with respect to the location 504. Correspondingly, the user may define a customized presence tag "Coffee" related to the location 504 using the presence client 110-1. Subsequently, the presence client 110-1 sends the customized presence tag "Coffee" to the presence server 102. In response to receiving the customized presence tag, the presence server 102 queries the location server 108 to obtain location data related to the mobile device 104-1. The location server 108 sends the location data related to the mobile device 104-1 in response to the query. The location data related to the mobile device 104-1 can include latitude and longitude data of the location 504. Thereafter, an association between the location data of the mobile device 104-1 in the location 504 and the customized presence tag "Coffee" is created by the presence server 102 in the database 112. Further, the presence server 102 publishes the customized presence tag "Coffee" to the mobile device 104-1 and one or more other mobile devices.

At a later time stamp, the user of the mobile device 104-1 exits 506 the location 504. The presence server 102 gets a notification from the location server 108 that the mobile device 104-1 is exiting the location 504. Instantly, upon exiting the location 504, the presence server 102 automatically publishes the default presence tag "Free" that is stored in the database 112 to the mobile device 104-1 and one or more other mobile devices. Moreover, the user of the mobile device 104-1 may override the currently published default presence tag "Free" by defining another customized presence tag using the presence client 110-1.

Further, at another point in time, the user of the mobile device 104-1 visits 508 the location 504. The location server 108 tracks the mobility of the mobile device 104-1 into the location 504. Subsequently, the location server 108 transmits the location data of the mobile device 104-1 to the presence server 102. Since the location data corresponding to the location 504 is associated with the customized presence tag "Coffee", the presence server 102 identifies the customized presence tag "Coffee" in the database 112. Therefore, the customized presence tag "Coffee" is automatically published to the mobile device 104-1 and one or more other mobile devices.

Alternatively, when the user of the mobile device 104-1 visits the location 504, the user may desire to update the customized presence tag "Coffee". Accordingly, the user may define an updated customized presence tag "Dining" related to the location 504 using the presence client 110-1. Thereafter, the presence client 110-1 transmits the updated customized presence tag "Dining" to the presence server 102. Upon receiving the updated customized presence tag, the presence server 102 replaces the customized presence tag "Coffee" with the updated customized presence tag "Dining" in the database 112. Moreover, the presence server 102 publishes the updated customize presence tag "Dining" to the mobile device 104-1 and one or more other mobile devices.

Figure 6:
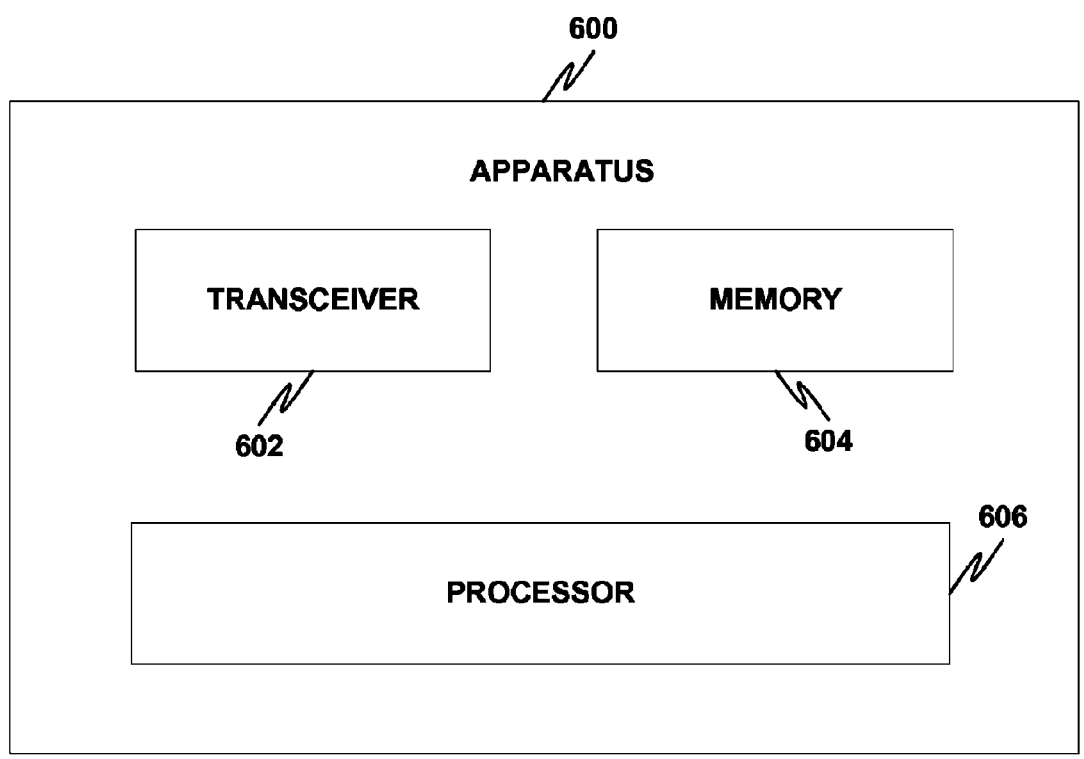
FIG. 6 is a block diagram of an apparatus for automated publishing of a customized presence tag to one or more mobile devices in a wireless communication network in accordance with an embodiment.

Turning to FIG. 6, a block diagram of an apparatus 600 for automated publishing of a customized presence tag to one or more mobile devices 104-n in a wireless communication network 106 in accordance with an embodiment is illustrated. In an embodiment, the apparatus 600 may be deployed independently in the wireless communication network 106 and can be coupled to one or more of a presence server and a location server. In another embodiment, the apparatus 600 can be an enhanced presence server, such as the presence server 102. The apparatus 600 includes a transceiver 602, a memory 604 and a processor 606. The memory 604 further includes a database, such as database 112 (not shown). The transceiver 602 is configured to receive location data of a mobile device such as the mobile device 104-1 from the location server 108. The location data of the mobile device 104-1 may comprise latitude and longitude data of a location of the mobile device 104-1. The location server 108 can track locations of the mobile device 104-1 by means of location tracking mechanisms such as GPS etc. In another embodiment, the mobile device 104-1 may include a location tracking mechanism such as AGPS. Therefore, the transceiver 602 may obtain the location data from the AGPS of the mobile device 104-1.

Further, the transceiver 602 is configured to receive an update relating to mobility data of the mobile device 104-1 from the location server 108. Therefore, the transceiver 602 receives updates from the location server 108 in response to movements of the mobile device 104-1 from one location to another location.

Moreover, the transceiver 602 is further configured to receive a customized presence tag related to the location of the mobile device 104-1. A customized presence tag includes personalized data associated with a location as specified by a user of the mobile device 104-1. Personalized data is set, selected or designated by the user for the mobile device and describes the location or the user's activity at the location and other related descriptors. The personalized data can include, for example, but not limited to, user specific data, a dimensional measures corresponding to a location, an expire time corresponding to the customized presence tag and a schedule information corresponding to the customized presence tag. The user specific data can be any data associated by the user to the location, a UserId of the mobile device, the expire time can be a time duration at which the customized presence tag would be made inactive in the database 112 and the schedule information can be a time duration for which the customized presence tag would be active in the database 112.

The location data and the customized presence tag as obtained by the transceiver 602 are stored in the database 112. The database 112 is further configured to store a default presence tag for locations for which a customized presence tag is unavailable. A default presence tag denotes a customized presence tag related to a previous location from where the user of the mobile device 104-1 entered the current location for which a customized presence tag exists.

The processor 606 is operatively coupled to the memory 604 and the transceiver. Once the transceiver 602 receives the location data of the mobile device 104-1, the processor 606 determines availability of the customized presence tag related to the location data of the mobile device 104-1 in the database 112 of the memory 604. In an embodiment, if the customized presence tag related to the location data of the mobile device 104-1 is determined to be available in the database 112, the processor 606 publishes the customized presence tag to the mobile device 104-1 of the user and to mobile devices belonging to other users including mobile devices 104-n. Alternatively, if the customized presence tag for the location data of the mobile device 104-1 is determined to be unavailable in the database 112, the processor 606 publishes the default presence tag to the mobile device 104-1 of the user and to mobile devices of other users including mobile devices 104-n.

In an embodiment, the user can update the customized presence tag corresponding to the location data of the mobile device 104-1. The transceiver 602 receives an updated customized presence tag and the processor 606 replaces the customized presence tag with the updated customized presence tag in the database 112 of the memory 604. Subsequently, the processor 604 publishes the updated customized presence tag whenever the user revisits the location.

Various embodiments provide a method and an apparatus for automated publishing of a customized presence tag to one or more mobile devices in a wireless communication network. The method offers a user of a mobile device to have greater flexibility in customizing their presence information and publish the customized presence information to other users. Moreover, the utilization of location tracking mechanisms facilitates automated publishing of user presence information by monitoring the mobility of the user in a location of a wireless communication network. The automated publishing of user presence information in a wireless communication network eliminates the need for the user to update the presence tag each time the user moves from one location to another. Furthermore, the method facilitates privacy of a user of a mobile device by avoiding publication of location data to other users.

What is claimed is:

1. A method for automated publishing of presence information in a communication system comprising a plurality of mobile devices, the method comprising:
   obtaining location data of at least one of a plurality of mobile devices in the communication system;
   determining availability of a customized presence tag corresponding to the location data, wherein a customized presence tag comprises user-defined attendance data associated by the user to a location;
   automatically publishing the customized presence tag corresponding to the location data to the at least one mobile device and at least one other of the plurality of mobile devices when the customized presence tag is determined to be available for the location data; and
   automatically publishing a default presence tag for the location data to at least one other of the plurality of mobile devices when it is determined that a customized presence tag is unavailable for the location data, wherein the default presence tag for the location data denotes a customized presence tag related to a previous location of the at least one mobile device,
   wherein one of the customized presence tag and the default presence tag is automatically published to the at least one mobile device and to the at least one other of the plurality of mobile devices when the at least one mobile device is present in a physical location associated with the location data.

2. The method of claim 1, wherein obtaining location data of a mobile device comprises receiving mobility data of the mobile device and updating the location data using the mobility data.

3. The method of claim 1, further comprising:
   receiving a customized presence tag corresponding to a location of the mobile device; and
   storing the customized presence tag corresponding to the location of the mobile device in a database.

4. The method of claim 1 further comprising:
   receiving an updated customized presence tag corresponding to a location for which a customized presence tag is available; and
   updating the customized presence tag with the updated customized presence tag corresponding to the location of the mobile device based on the location data of the mobile device.

5. The method of claim 1, wherein the location data of the mobile device is obtained from a location service provider.

6. The method of claim 1, wherein the customized presence tag is one of a plurality of presence tags on a presence tag list, wherein the presence tag list comprises at least one customized presence tag defined by a user of the mobile device.

7. The method of claim 6, wherein the presence tag list is stored in one of a database of the mobile device and a database provided in a network.

8. The method of claim 1, wherein the user-defined attendance data comprises at least one of a user specific data, a dimensional measures corresponding to the location, an expire time corresponding to the customized presence tag and a schedule information corresponding to the customized presence tag.

9. An apparatus comprising:
   a transceiver for receiving location data of a mobile device;
   a memory coupled to the transceiver for storing a customized presence tag corresponding to a location and a default tag for locations for which a customized presence tag is unavailable; wherein a customized presence tag comprises user-defined attendance data associated by a user to the location; and
   a processor operatively coupled to the memory and the transceiver, the processor is configured to:
   determine availability of the customized presence tag corresponding to the location data;
   automatically publish the customized presence tag corresponding to the location data to the mobile device and at least one other of the plurality of mobile devices when the customized presence tag is determined to be available for the location data; and automatically publish a default presence tag for the location data to at least one other of the plurality of mobile devices when it is determined that a customized presence tag is unavailable for the location data, wherein the default presence tag for the location data denotes a customized presence tag related to a previous location of the mobile device, wherein one of the customized presence tag and the default presence tag is automatically published to the mobile device and to at least one other of the plurality of mobile devices when the mobile device is present in a physical location associated with the location data.

10. The apparatus of claim 9, wherein the transceiver is further configured to receive an update corresponding to mobility data of the mobile device.

11. The apparatus of claim 9, wherein the transceiver is further configured to receive the customized presence tag corresponding to the location of the mobile device.

12. The apparatus of claim 11, wherein the processor is further configured to store the customized presence tag in a database in the memory.

13. The apparatus of claim 9, wherein the transceiver is further configured to receive an updated customized presence tag corresponding to the location for which a customized presence tag is available.

14. The apparatus of claim 12, wherein the processor is further configured to update the customized presence tag with the updated customized presence tag corresponding to the location of the mobile device.

15. A method comprising:
receiving a customized presence tag corresponding to a location of a mobile device, wherein a customized presence tag comprises user-defined attendance data associated by a user to a location;
retrieving a location data corresponding to the location of the mobile device in response to receiving the customized presence tag;
creating an association between the customized presence tag and the location data corresponding to the location of the mobile device;
automatically publishing the customized presence tag corresponding to the location data of the mobile device to the mobile device and to at least one other of the plurality of mobile devices when the mobile device is present in a physical location associated with the location data; and
automatically publishing a default presence tag for the location data to at least one other of the plurality of mobile devices when it is determined that a customized presence tag is unavailable for the location data, wherein the default presence tag for the location data denotes a customized presence tag related to a previous location of the mobile device.

16. The method of claim 15, wherein creating comprises replacing a customized presence tag associated with the location data of the mobile device with the updated customized presence tag.

* * * * *